United States Patent [19]

Ozawa et al.

[11] Patent Number: 5,517,409
[45] Date of Patent: May 14, 1996

[54] IMAGE FORMING APPARATUS AND METHOD HAVING EFFICIENT TRANSLATION FUNCTION

[75] Inventors: Toshiro Ozawa; Kyoji Omi, both of Kawasaki, Japan

[73] Assignee: Ricoh Company, Ltd., Tokyo, Japan

[21] Appl. No.: 35,583

[22] Filed: Mar. 23, 1993

[30] Foreign Application Priority Data

Mar. 24, 1992  [JP]  Japan ................................. 4-096962
Mar. 24, 1992  [JP]  Japan ................................. 4-096963

[51] Int. Cl.$^6$ ..................................................... G06F 17/28
[52] U.S. Cl. .......................... 364/419.03; 364/419.05; 364/419.07
[58] Field of Search ..................... 364/419, 419.02, 364/419.03, 419.05, 419.07; 355/200, 326

[56] References Cited

U.S. PATENT DOCUMENTS

| | | | |
|---|---|---|---|
| 4,599,612 | 7/1986 | Kaji et al. ............................. | 340/723 |
| 4,890,230 | 12/1989 | Toroshima et al. ................. | 364/419.03 |
| 5,005,127 | 4/1991 | Kugimiya et al. ................... | 364/419.05 |
| 5,063,508 | 11/1991 | Yamada et al. ...................... | 364/419.03 |
| 5,175,684 | 12/1992 | Chong .................................. | 364/419.03 |
| 5,200,893 | 4/1993 | Ozawa et al. ........................ | 364/419.1 |
| 5,303,151 | 4/1994 | Neumann ............................. | 364/419.02 |

FOREIGN PATENT DOCUMENTS 62-154845  9/1987  Japan.
64-57369  3/1989  Japan.

Primary Examiner—Gail O. Hayes
Assistant Examiner—Stephen Tkacs
Attorney, Agent, or Firm—Lowe, Price, LeBlanc & Becker

[57] ABSTRACT

A dictionary unit stores therein a first group of words and a second group of words, both the first and second groups of words having been predetermined, each word of the first group of words being accompanied by a word (a translation word) obtained as a result of translation of the word of the first group of words. An extracting unit extracts a word from a given image. A translating unit obtains the translation word accompanying the word in the first group of words, which word corresponds to the word extracted by the extracting unit of the dictionary unit in a case where the word extracted by the extracting unit corresponds to a word in the first group of words stored in the dictionary unit, and the translating unit determining not to translate the word extracted by the extracting unit in a case where the word extracted by the extracting unit corresponds to a word corresponding to the second group of words stored in the dictionary unit. An image forming unit forms an image including the given image and the translation word obtained by the translating unit so that the word obtained by the translating unit accompanies the word extracted by the extracting unit.

3 Claims, 10 Drawing Sheets

FIG. 5

The performances of static random access memories (SRAMs), have been rapidly improved by the use of scaled devices. They have been mainly developed for cache memories in high performance computer systems SRAMs, whose memory cells are generally composed of a flip-flop circuit, have several advantages over dynamic RAMs (DRAMs), as follows: (1) It is not necessary for SRAMs to refresh signals in memory cells periodically (2) SRAM operational speeds are much faster, because a pair of differential signals are used to write data into and read data from memory cells. (3) SRAM operational modes are simple

FIG. 6

The performances of static random access memories (SRAMs), have been rapidly improved by the use of scaled devices. They have been mainly developed for cache memories in high performance computer systems SRAMs, whose memory cells are generally composed of a flip-flop circuit, have several advantages over dynamic RAMs (DRAMs), as follows: (1) It is not necessary for SRAMs to refresh signals in memory cells periodically (2) SRAM operational speeds are much faster, because a pair of differential signals are used to write data into and read data from memory cells. (3) SRAM operational modes are simpler, because address signals are si...

"SENOU" 性能

"SOUSAJOU-NO" 操作上の

Labels: 122p, 122pw1, 122pw2_1, 122pw2_j, 122pw2_2, 122pww, 122pw3_1, 122pw3_j, 122pw3_2

IMAGE FORMING APPARATUS AND METHOD HAVING EFFICIENT TRANSLATION FUNCTION

BACKGROUND OF THE INVENTION

The present invention relates to an image forming apparatus and method which can be applied to duplicators having a function of translating words included in an image to be duplicated. The present invention particularly relates to an image forming apparatus and method by which, in a case where an original image comprising words from a first language (first-language words) is to be duplicated, image parts comprising words from a second-language (second language words), obtained as a result of translating the first-language words to the corresponding respective second-language words are displayed in the duplicated image.

There are many instances when a person who is reading a document written in a foreign language finds it easy to interpret, the meaning of the document except for a number of words of the document, which words are difficult for the person to understand without using a dictionary. In these instances the entire document or a large portion thereof becomes difficult for the person to understand. In these cases, utilizing an appropriate dictionary may facilitate continued reading of the document as a result of interpreting the particular words by means of the dictionary.

In an example of such a duplicator, Japanese Laid-Open Patent Application No. 62-154845 discloses a translation duplicator which automatically provides duplicate image including translation words corresponding to words included in an original image to be duplicated, the document corresponding to one in which an original image was written in a foreign language. In the technology of the disclosed duplicator, an image reading means reads an original image, then a distinguishing means distinguishes information of the read original image so as to divide the information into corresponding picture information and character information, a translating means then recognizing the character information for each character (letter) so as to interpret the character information into a language different from the one corresponding to the original document. The interpreted character information is then output accompanied by the duplicated original image. This technology can eliminate a need for utilizing of a manual dictionary while reading documents written in a foreign language.

Such a technology has problems for a person who has some knowledge of the foreign language concerned. This is because the related automatic translation technology cannot remove all errors from the translating operation, and the cost required to acquire automatic translation capabilities is relatively high. Therefore, such a technology may provide rather redundant functions and may sometimes provide not very useful functions.

Further, outputting all the translation words obtained as a result of respectively translating all of the words of the original image, both all of the translation words and all of the original words being output in a common output image, results in characters of the output image being reduced in size accordingly, particularly in a case where a size of the output image is nearly the same as the size of the original (input) image. Alternatively, a number of pages of the output image may increase, and/or outputting of the output image may take a longer time. Such phenomena degrade the efficiency of operation for processing image information even though the phenomena occurs as a result of translating operations being added.

Japanese Laid-Open Patent Application No. 64-57369 discloses a translation word outputting apparatus in which each word stored in a dictionary has a corresponding ranking information for ranking the words in accordance with a corresponding part of speech or in accordance with a rank representing a difficulty of interpreting the word, the ranks being selected arbitrarily. A problem occurs in the apparatus in that the all of the in the image words have corresponding translation words, a large storing capacity thus being needed for the dictionary. Another problem is that the relationships in relative locations of the output image original words and the corresponding translation words is not considered enough, as shown in FIG. 6 of the disclosure. Thus, an easy-to-read image is not realized in the output image of the apparatus.

SUMMARY OF THE INVENTION

An object of the present invention is to provide an image forming apparatus and method having a translation function that results in an output image including translation words corresponding to a limited number of words included in the original image. Thus, easiness of reading and understanding the duplicate output image is maintained, and the necessary translation words can be obtained immediately, these advantages bringing about no remarkable increase of cost. The words not included in the limited number of words comprise, for example, a verb "is", and a preposition "with" of the English language words. Meanings of these words are easy to recognize; however it may be difficult to apply respective simple appropriate Japanese-language words to them. (This phenomena is made obvious by referring to an English-Japanese dictionary. For example, many translated Japanese-language words can be found under a heading of the verb "be" which verb is to be referred to when the English-language word "is" is involved. Further, translation of these words is generally not necessary because actual meanings of them may be easily understood and interpreted for a person who has a knowledge of English language.

Another object of the present invention is to provide an image forming apparatus and method having a translation function that improves a quality of translation and an output speed over the related technology.

To achieve the above objects, the image forming apparatus according to the present invention comprises:

dictionary means for storing therein a first predetermined group of words and a second predetermined group of words, each word of the first group of words being accompanied by a translation word obtained as a result of translating the corresponding word of the first group of words;

extracting means for extracting a word from a given image;

translating means for obtaining a translation word accompanying a word corresponding to the word extracted by the extracting means of the dictionary means in a case where the word extracted by the extracting means corresponds to the first group of words stored in the dictionary means, the translating means determining not to translate the word extracted by the extracted means in a case where the word extracted by the extracting means corresponds to the second group of words stored in the dictionary means;

image forming means for forming an image including the input image and the word obtained by the translating means so that the word obtained by the translating means accompanies the word extracted by the extracting means.

Thus, only the practically necessary words are translated. Further, storing the second group of words saves time by eliminating an extra operation for determining that the input word is not included in the dictionary means. This determination can be made in a case where the second group of words is not stored, after searching all the words stored in the dictionary for all words not included in the first group of words. In a case where the second group of words are stored, the searching operation is executed only until the objective input word is found in the dictionary means, if the objective input word is not included in the first group of words and is included in the second group of words. Thus, searching all the words in the dictionary means is not needed, and an unnecessary time requirement may be eliminated. Further, in the related technology, it is necessary to provide respective corresponding translation words for the second group of words. Thus, with the present invention, a storage capacity, in the corresponding memory of the dictionary means, used to store the translation words can be reduced by eliminating the translation words for the second group of words.

Another object of the present invention is to provide an image forming apparatus and method having a translation function that outputs translation words corresponding to words that are similar or have the same spelling in a page of the original image, where the number of the output translation words is fewer than the number of similar words included in the page of the input original image, when similar words are included in the page of the original image. Thus, ease of reading of the output image comprising the duplicated image can be maintained, and an appropriate number of translation words needed for a person to understand and interpret the corresponding document is output.

To achieve the above objects, an image forming apparatus according the present invention, further comprises a translating word word-number limiting means for, when a number of words extracted by the extracting means is in excess of the predetermined number, causing a number of the translation words appearing in the image to be formed to be limited to a predetermined number, the translation word having been obtained as a result of respectively translating words extracted by the extracting means, which words extracted by the extracting means are similar to each other.

Thus, complicated constitution of the output image caused by undue repeated of translation words in the output image, which words are common words in the original image, can be eliminated. The translation words are then displayed in the output image at predetermined intervals appropriate for the number of occurrences of the common words.

Another object of the present invention is to provide an image forming apparatus and method having a function of translation that, when words having common fundamental form are included in the page of the original image, outputs translation words corresponding to words of the original image having a common fundamental form, wherein the number of output translation words is fewer than the number of words of the input original image which having the common fundamental form. Thus, the redundancy included in the image information apparatus and method can be reduced. Examples of words having a common fundamental form are words obtained as a result of varying the fundamental form thereof and words obtained as a result of derivation from the fundamental form thereof, such as a past-tense form, a past-participle form, or a present-participle form of a verb.

To achieve the above object, in the image forming apparatus according to the present invention, the dictionary means further stores, where appropriate, predetermined fundamental-form information for each word of the first group of words, the fundamental-form information comprising a corresponding fundamental form, and the translating word word-number limiting means, when a number of words extracted by the extracting means having common fundamental forms exceeds a predetermined number, causing limiting the number of translation words appearing in the image to be formed to a predetermined number, the translation words having been obtained as a result of respectively translating words extracted by the extracting means, which extracted words have common fundamental forms.

Thus, undesirable repeated display of translation words in the output image, which translation words correspond to similar words included in the input original image, can be reduced. Thus, an easy-to-read image can be immediately output.

Other objects and further features of the present invention will become more apparent from the following detailed description when read in conjunction with the accompanying drawings.

BRIEF DESCRIPTION OF DRAWINGS

FIG. 5 shows an original image comprising English language words, the image being an image to be duplicated and words included in the image being words to be translated;

FIG. 6 shows an output image obtained as a result of translating words included in the original image of FIG. 5, and duplicating the image of FIG. 5, translation words being attached to the duplicated image, translated by using the duplicator of FIG. 1;

Figure 1:
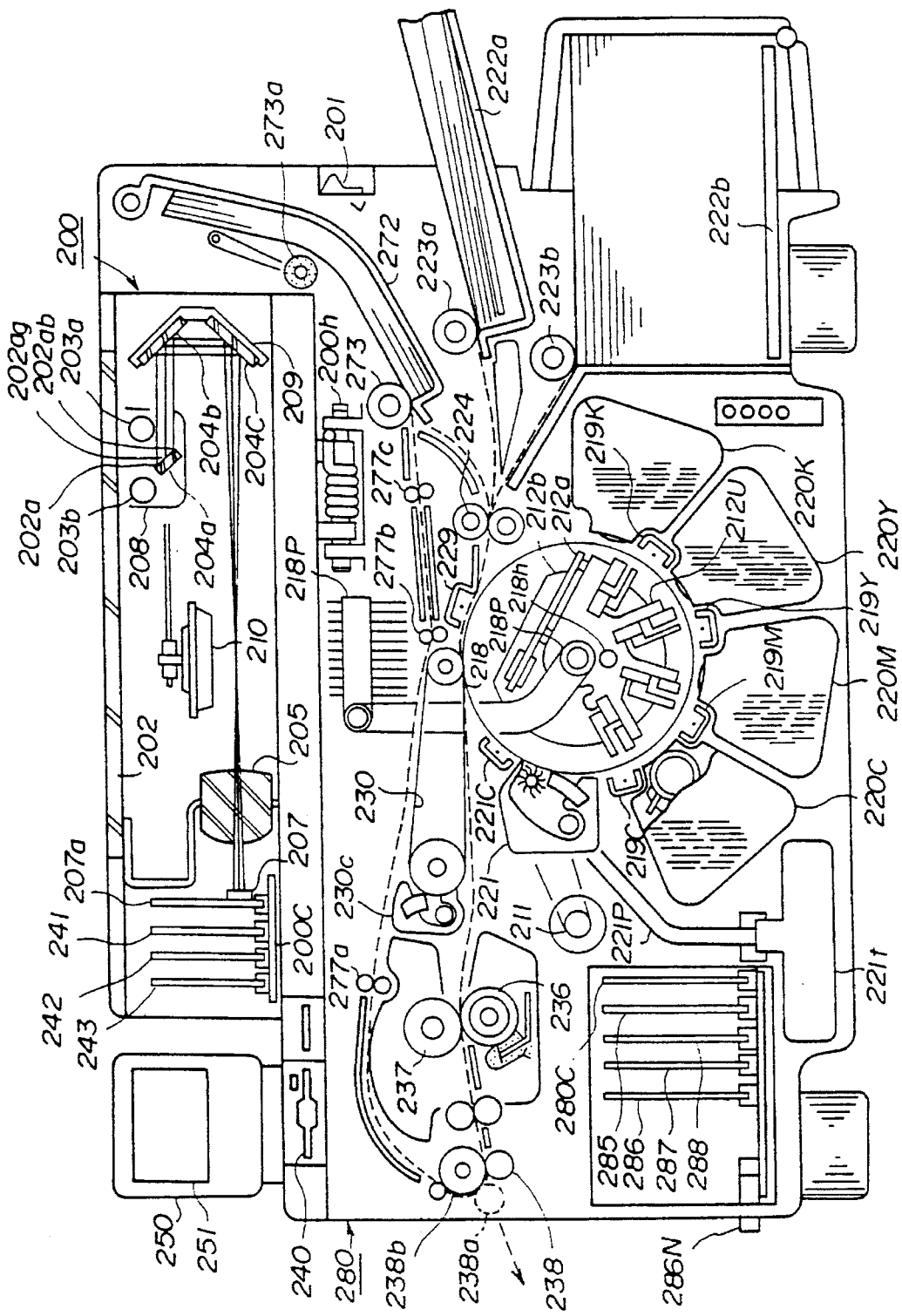
FIG. 1 shows a main mechanism of a digital color duplicator according to an embodiment of an image forming apparatus of the present invention.

DESCRIPTION OF THE PREFERRED EMBODIMENT (1) Description of modules:

A general construction of a mechanism of a digital color duplicator to which an embodiment of an image forming apparatus according to the present invention is preferably applied will now be described with reference to FIG. 1. The duplicator comprises two modules, a scanner module 200 and a printer module 280. The scanner module 200 executes a process for reading an original image and the printer module 280 executes a process for forming an output image. The back portion (the right side in FIG. 1) of the scanner module 200 is connected to the back top portion (right top side in FIG. 1) of the printer module 280 by using a hinge 200h so that the scanner portion 200 can pivot on the hinge 200h with respect to the printer module 280.

(2) Constitution of function blocks:

Constitutions of function blocks of the duplicator of FIG. 1 will now be described with reference to FIG. 3. The duplicator of FIG. 1, which figure shows various means in the duplicator functionally, generally comprises: basic image-processing means 241, intelligent image-processing means 242, external-unit connecting systems 286N, 286, 287 and 288, a console 250, and a system controller (SCON) 285, in addition to the scanner module (SC) 200 and the printer module (PC) 280. In a mechanism of the duplicator of FIG. 1, both the basic and intelligent image-processing means 241 and 242 are located in the scanner module (SC) 200, the console 250 is located on top of the scanner module (SC) 200, and the external-unit connecting systems 286N, 286, 287 and 288 and the system controller (SCON) 285 are located in the printer module 280.

Figure 3:
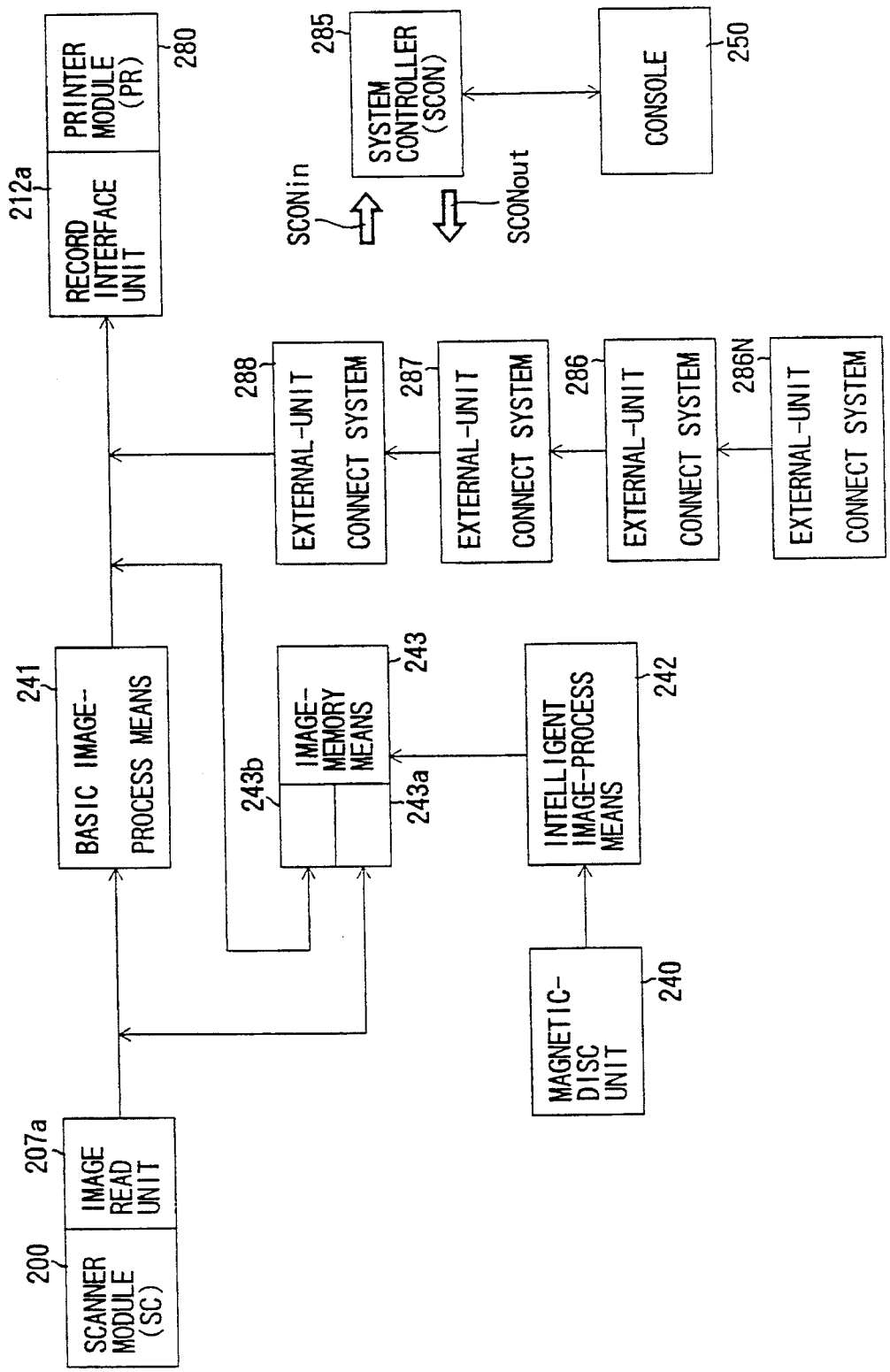
FIG. 3 shows a signal-processing block diagram of the duplicator of FIG. 1.

(3) General function of individual function blocks and signal flows for the function blocks:

Arrows indicated between the function blocks in FIG. 3 represent flows of image signals or flows of control signals. The system controller (SCON) 285 has a function to control the entire system of the duplicator of FIG. 1. This system control is executed by the system controller (SCON) 285 transmitting commands using communication means SCONout, and receiving responses using communication means SCONin, (the communication means SCONout and SCONin are indicated as thick outlined arrows in FIG. 3), the command and responses being sent or received by subsystems of the duplicator of FIG. 1. Example of subsystems of the duplicator of FIG. 1, are the scanner module (SC) 242, the printer module (PR) 280, the intelligent image-processing means 242 among others. Further, the system controller (SCON) 285 has a function by which an automatic draft-paper (comprising an original image) carrying unit (ADF), a (output-paper) sorter, and any other optional modules may be controlled as necessary.

Figure 9A:
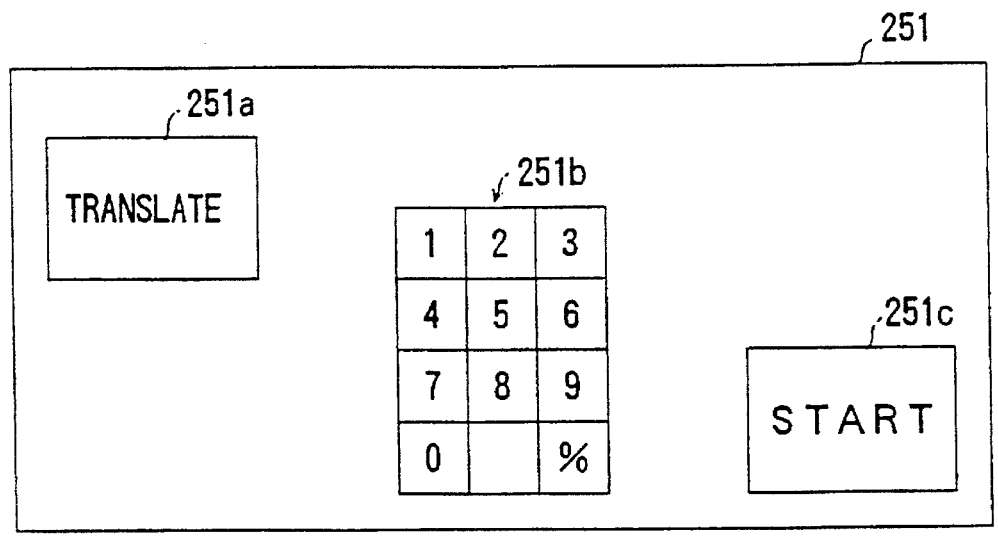
FIGS. 9A and 9B show examples of displays on a console of the duplicator of FIG. 1.
Figure 9B:
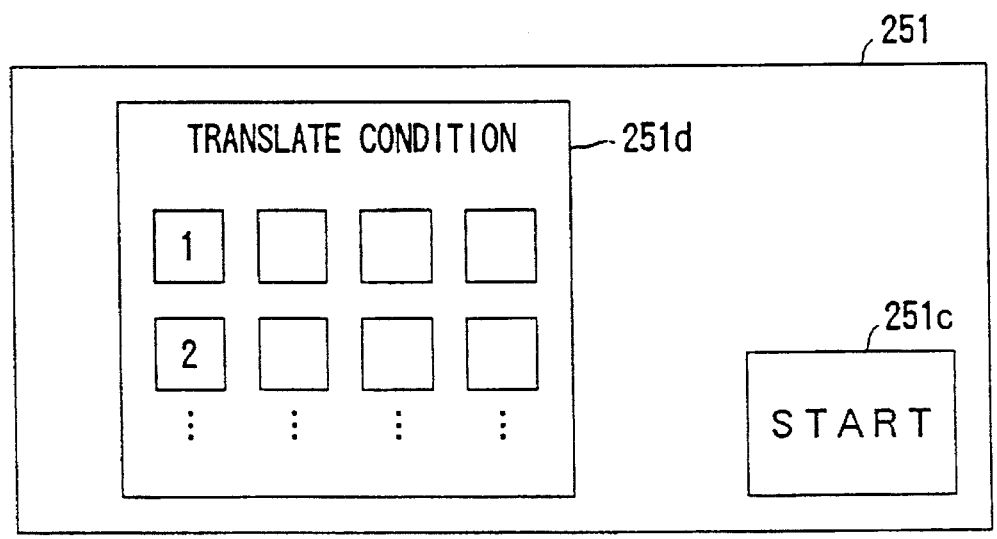
Figure 10:
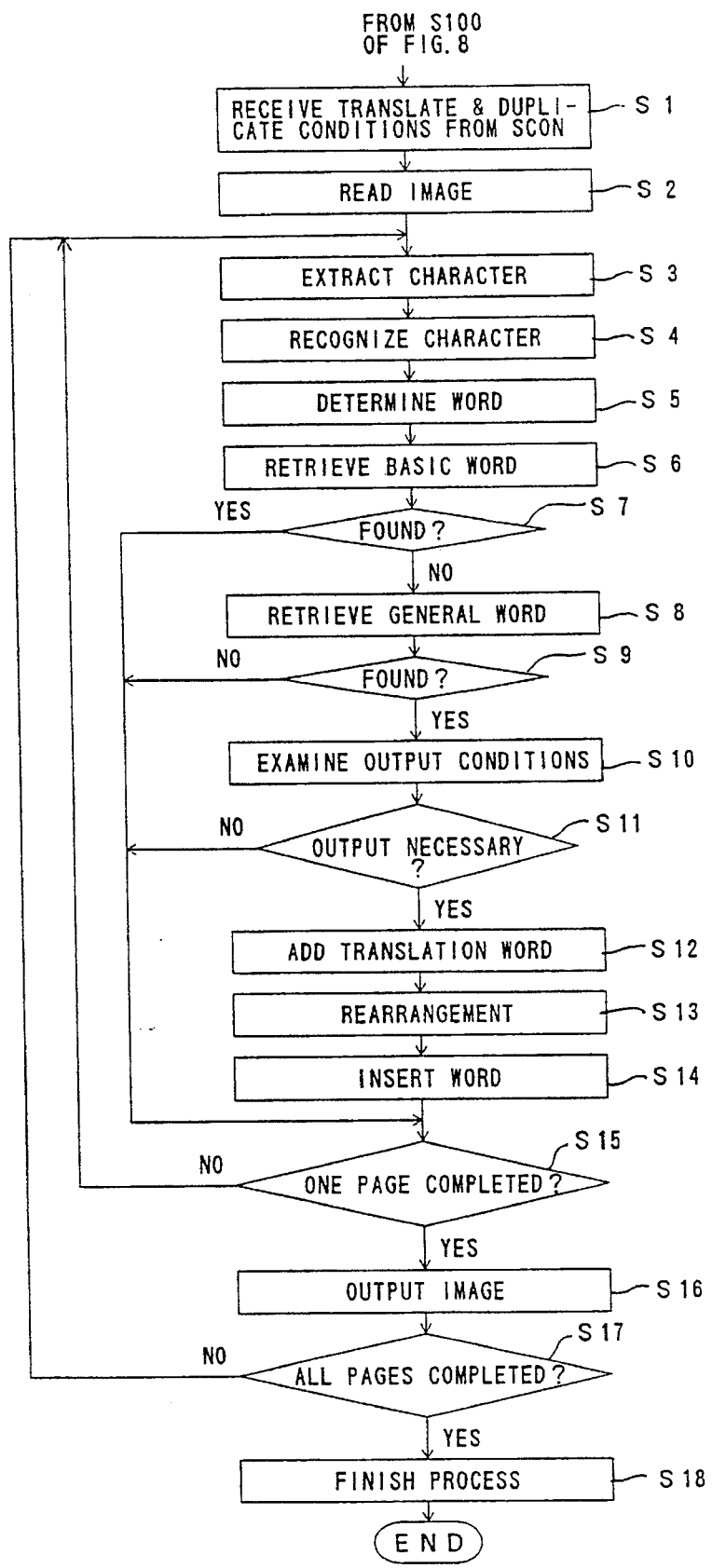
FIG. 10 shows a flow-chart detailing translating process of the duplicator of FIG. 1.

The console 250, examples of displays thereof being shown in FIGS. 9A and 9B, outputs messages for an operator, and the console 250 has a function to input various kinds of directives to the duplicator of FIG. 1 in accordance with specifications specified by the operator. Further, the scanner module (SC) 200 has a function of reading an original color-picture and a function of outputting RGB image signals, that is, signals of R (red), G (green), and B (blue) to the basic image-processing means 241 and to the image memory means 243.

The basic image-processing means 241 has a function of executing various kinds of image processes to be performed on the original-picture RGB signals, and then converting the original-picture RGB signals into CMYK image-forming signals, that is, signals of C (cyan), M (magenta), Y (yellow), and K (black). Further, the basic image-processing means 241 has a function to output the CMYK signals to the printer module (PR) 280 or to the image memory means 243. The printer module (PR) 280 forms a printed output image on output sheets of paper based on the CMYK image signals which have been provided to the record interface unit 212a.

Each system of the external-unit connecting systems 286N, 286, 287 and 288 has a function in which an external unit, that is, a unit provided outside of the duplicator of FIG. 1, provides an image signal or a character (letter) signal to the external-unit connecting systems 286N, 286, 287, and 288, the provided signal being converted into the corresponding CMYK recording signals, and the converted signals being transmitted to the printer module (PR) 280. A mode in which an original image input by using the external-unit connecting systems 286N, 286, 287, and 288 is reproduced will be called a "printer mode", and a mode in which an original image read by using the scanner module (SC) 200 is reproduced will be called a "copy mode".

The image memory means 243 has a function of storing RGB data corresponding to a sheet of paper of an original image, or of storing CMYK data corresponding to a sheet of paper of an output image. Further, the intelligent image-processing means 242 has a function for performing high-grade image processing on image data stored in the image memory means 243. The intelligent image-processing means 242 and the image memory means 243 are indicated in FIG. 3 to illustrate corresponding logical signal-flows, please note that the units and the signal flows shown in the figure are simplifications used for the sake of simplicity. The magnetic-disc unit 240 has a function for storing image data and programs for intelligent image processing.

(4) Detailed construction of the scanner module (SC) 200:

As shown in FIG. 1, the scanner module 200 comprises a scanner control unit 200c, a contacting glass 202, a first carriage 208, a second carriage 209, draft illuminating lamps 203a and 203b, first, second and third mirrors 204a, 204b and 204c, an imaging lens 205, a CCD color image pickup device 207, an image-reading unit 207a, the magnetic-disc unit 240, the basic image-processing means 241, the intelligent image-processing means 242, the image memory means 243, image input/output units 243a and 243b of the image memory means 243, an original-image scanning motor 210, the console 250, and an operating panel 251 of the console 250, which panel 251 comprises a transparent touch switches and a liquid-crystal display means, as shown in FIGS. 9A and 9B.

(5) Image reading operations in the scanner module (SC) 200:

The scanner module (SC) has a function of sampling the original image at a $\frac{1}{16}$ mm of sampling density for a main scanning and a sub-scanning, and of then quantizing the sampled image data into corresponding data which can express 256 tones for each color of RGB colors, so as to read the original image. A sheet of paper of the original image is placed on the platen (contacting glass) 202 so that a side of a sheet of paper to be read faces the platen 202. The imaging lens 205 forms, on an irradiating surface of the CCD 207, an image corresponding to the original image, the formed image being of a reduced size as compared to the original image. The CCD 207, comprising a color image pickup device, comprises the following three rows of image pickup units, the rows being arranged so as to be parallel to each other: an R image pickup unit in which 4752 red-filter covered pixels are arranged along one-dimension; a G image pickup unit in which 4752 green-filter covered pixels are arranged along one-dimension; and a B image pickup unit in which 4752 blue-filter covered pixels are arranged along one-dimension.

In FIG. 1, indicated positions 202ar, 202ag, and 202ab of image-reading scanning lines for colors R, G, B are exaggerated, these positions standing almost close to each other in the figure actually, and when, in actuality, the positions are separate from each other at intervals equivalent to $\frac{3}{16}$ mm. The CCD 207 divides a main-scanning line of each color, which main scanning line is projected via the lens 205, into portions in accordance with a pixel density of (16 pixels)/ mm, which pixel density is measured based on the original image size, and then reads the line by means of sampling.

The illuminating lamps 203a and 203b and the first mirror 204a are mounted on the first carriage 208 and the second and third mirrors 204b and 204c are fixed on the second carriage 209. When the original image is read, the first and second carriages 208 and 209 are driven by the draft scanning motor 210 at a sub-scanning speed Vsub and at a main-scanning speed Vsub/2, respectively, so as to scan the original image, an optical conjugate relationship between the first and second carriages 208 and 209 being maintained. The CCD 207 provides an analog voltage corresponding to RGB lights reflected in pixel units from the original image, in a pixel unit and the image reading unit 207a the RGB lights, using the obtained analog voltage, quantized into an eight-bit digital signal by which 256 tones can represented accordingly.

The image reading unit 207a has a function of monochromatic binary-conversion by which a monochromatic tone indicated by a signal corresponding to the original image is output after simple binary conversion is performed when a monochromatic binary-conversion processing command is given by the system controller (SCON) 285. Image data obtained by the above processes, which data has been quantized for each of the RGB colors, is transferred to the basic image-processing means 241 and to the image memory means 243.

(6) Basic image-processing operation:

The given RGB image information corresponding to the read original image is input into the basic image-processing means 241. The functions of the basic image-processing means 241 comprise the following two categories of functions:

(6)-1. A first category of functions:

The first category of functions are functions for supporting the modifying of images and are not functions for directly modifying the image signal. Examples of the functions of the first category are an image separating process, an image-size detecting process, and a color/monochromatic-image determining process. The image separating process defines the input image into a character (letter) area and a tone-image area. The image-size detecting process detects a size of the original image. The color/monochromatic image determining process determines whether the original image is a color image or a monochromatic image. Such processes comprise processes, one example of such a process is the image-size detecting process which requires examining the entire information of the original image placed on the platen 202 and thus requiring a so-called pre-scanning that should be executed before the duplicated image forming process.

(6)-2. A second category of functions:

The second category of functions comprises processes of modifying the image signal, that is, image processing processes, some examples of which are: magnifying/reducing the size of the original image, moving a position of the image, a color correction, or a tone conversion. The image processing processes comprises two types of processes. A first type of processes comprise processes performance of which is common for all areas constituting the original image, one example of such a process is the size magnifying/reducing process. A second type of processes comprises process performance of which processes are different depending on areas constituting the original image, one example of such a process is the tone processing process. An example of the second type of processes is the tone processing process, this process is only applied to an image part comprising several tones.

Most processing results of the processes of the first category are transferred to the system controller (SCON) 285. The system controller (SCON) 285, upon receiving the processing results, proceeds an image forming process by outputting control directives to the other means, based on the processing results. In an example of the image forming process, when the basic image-processing means 241 determines that "the original image comprises a monochromatic image", the determination is transferred to the system controller (SCON) 285, and the system controller (SCON) 285 then outputs to a control unit 280c of the printer module (PR) 280 a command for activating of the K developing and a command for stopping of the CMY developing. Thus, the printer control unit 280c executes the image forming process under a condition in which only the K developing unit 220K is activated and developing processes for other colors are stopped.

There are three activating styles for activating the processes of the second category as follows. The second category processes may be automatically activated in response to a processing result of a process of the first category, the second category processes may be activated in response to an operator inputting a corresponding specification by using the console 250; and lastly, the second category processes may be activated in response to a combination of processing results of the first category processes and an operator inputting a corresponding specification. In any of the three styles, the RGB signals input to the basic image-processing unit 241 are converted into signals C (cyan), M (magenta), Y (yellow), and K (black), for recording. The converted signals are then input to a recording interface unit 212a, acting as inputting unit, of the printer module (PR) 280. When it is determined that the original image comprises a monochromatic image, a value 0 is output as the CMY signals other than the K signal.

Figure 4:
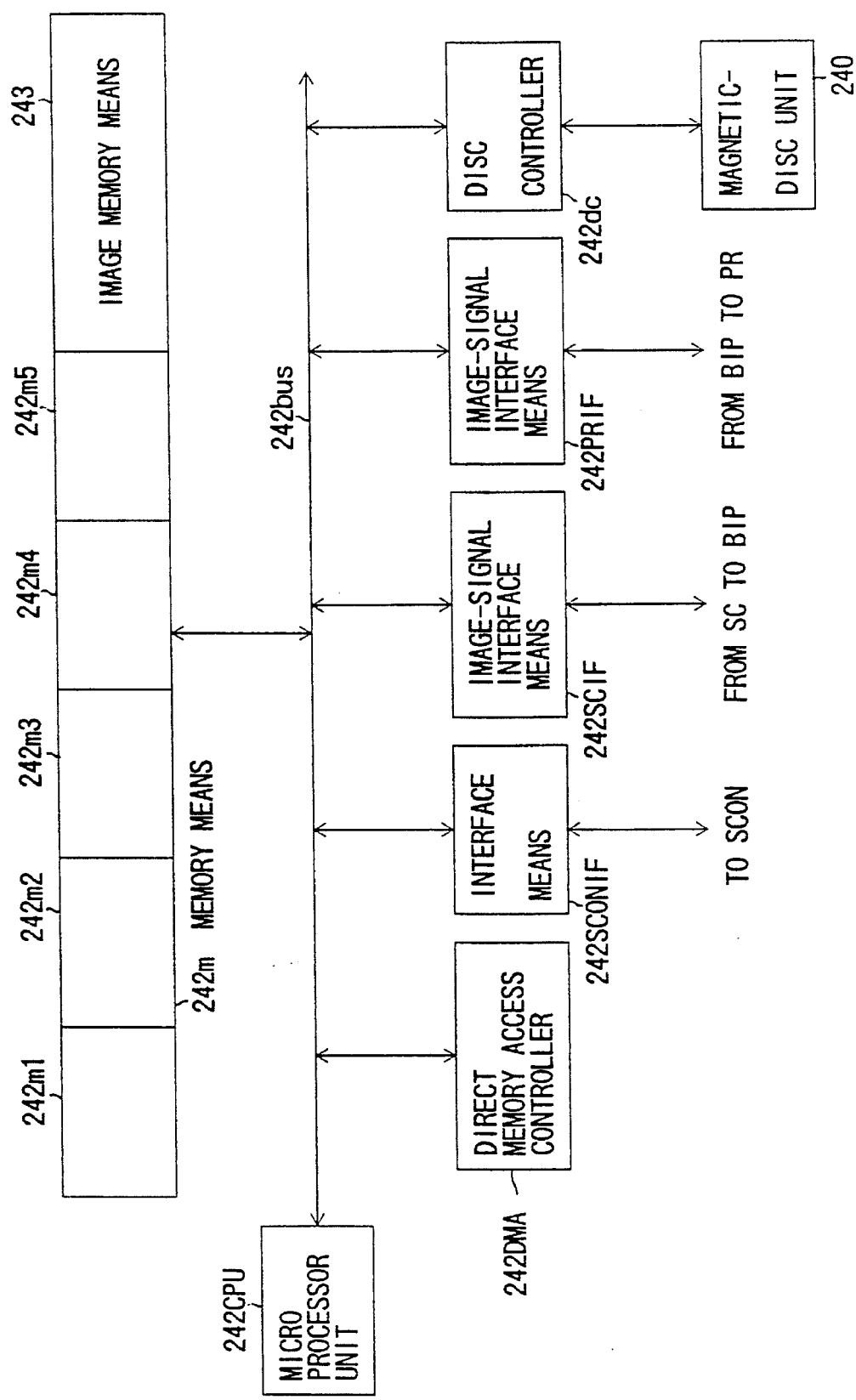
FIG. 4 shows a block diagram of hardware of an intelligent image-processing means of the duplicator of FIG. 1.

(7) A constitution of hardware regarding the intelligent image-processing process:

A constitution of hardware regarding the intelligent image-processing means 242 and hardware regarding the image memory means 243 will now be described with reference to FIG. 4. Parts having reference numerals starting with FIGS. "242" are elements constituting the intelligent image-processing means 242.

The intelligent image-processing means 242 comprises a 32-bit micro processor unit 242CPU, a 32-bit bus 242bus, a direct memory access controller 242DMA, interface means 242SCONIF used to connect the intelligent image-processing means 242 to the communication means SCONin and SCONout, image-signal interface means 242SCIF which corresponds to an image input/output unit 243a and which is used to connect the intelligent image-processing means 242 to an image-signal output unit of the scanner module (SC) 200, image-signal interface means 242PRIF which corresponds to an image input/output unit 243b and which is used to connect the intelligent image-processing means 242 to an image-signal input unit of the printer module (PR) 280 or to connect to basic image-processing means 241 which is equivalent to the image-signal input unit of the printer module (PR) 280, a disc controller 242dc which is used to control the magnetic-disc unit 240, and memory means 242m which is used to store programs and/or other information.

The memory means 242m comprises five separate memory parts 242m1, 242m2, 242m3, 242m4, and 242m5, and each of these memory parts has a particular use different from that of each of the other memory parts. A part of a memory space is allocated to the image memory means 243 which means is provided by mapping in the part of a memory space which the bus 242bus of the micro processor unit 242CPU can address linearly. The micro processor unit 242CPU treats both the image memory means 243 and the other memory means 242m uniformly (that is, not hierarchally).

The image input/output units 243a and 243b of the image memory means 243 are not directly connected to the image memory means 243. The image signal interface means 242CIF and 242PRI (corresponding to the image input/output units 243a and 243b, as mentioned above) are connected to the bus 242bus and the image memory means 243 is connected the bus 242bus, so that the image input/output units 243a and 243b are connected to the image memory 243 via the bus 242bus. The micro processor 242CPU may transfer image data between the image memory means 243 and the image input/output units 243a and 243b by means of a data transferring command. Further, the direct memory access controller 242DMA may access the bus 242bus and may transfer image data at high speed so that the transfer speed of the image data can match the image reading speed or the data recording speed. The above conditions, under which the image memory means 243 and the image input/output units 243a and 243b are connected to each other, are not indicated in FIG. 3 for the sake of simplicity.

(8) The intelligent processing operations:

"Intelligent processing operations", in the embodiment of the present invention, signifies high-grade image-processing functions other than functions provided to conventional duplicators. In the case where intelligent image processing is carried out, it is not easy or rational to execute necessary functions by proximity processing. (The proximity processing means processing image, for example, one pixel by one pixel successively, by examining, for example, pixels proximate to the current pixel, such as (8 pixel) * (8 pixel) or (several pixels)*(several pixels). Such proximity processing is not useful for, for example, recognizing of characters included in the image because each character comprises pixels, a number of which pixels is greater that a number of pixels examined in the proximity processing.) Thus, data of the read original image information output from the image read unit 207a is temporarily stored in the image memory means 243. The intelligent image-processing means 242 then executes image processing using the information stored in the image memory means 243 and converts data resulting from the image processing into data to be recorded (recording data). The intelligent image-processing means 242 then outputs recording data corresponding to the recording information to the recording interface unit 212a, which acts as an inputting part for the image forming process, so that a visible image is formed on a recording medium. Thus, when using the intelligent image processing, a small time lag occurs between reading the original image and outputting the output image.

It is possible to combine the basic image processing with the intelligent image processing. In the above case, data to be input to the image memory means 243 comprises data output from the basic image-processing means 241 instead of comprising data output from the image reading unit 207a.

Figure 2:
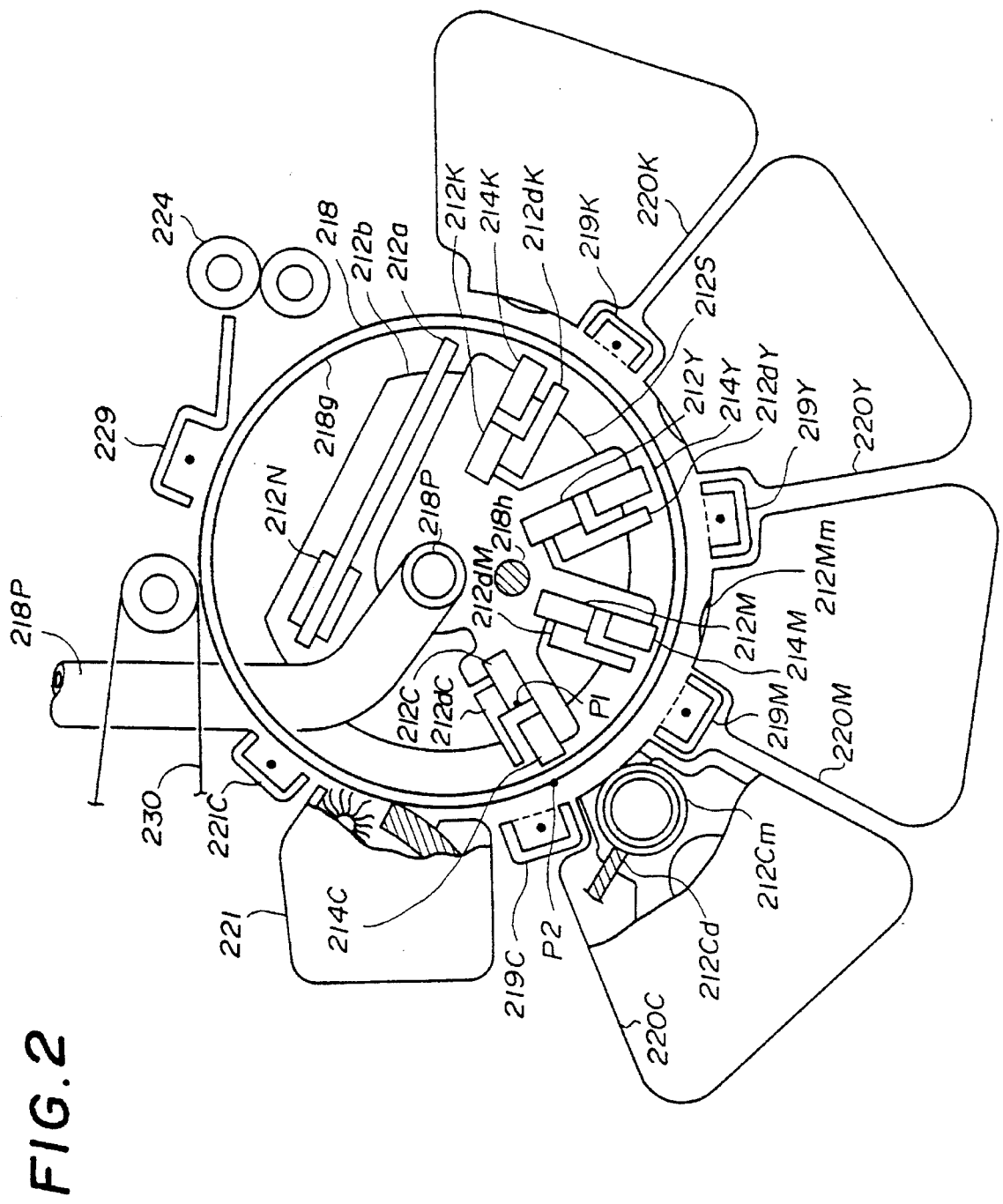
FIG. 2 shows a construction of an image forming unit of the duplicator of FIG. 1.

(9) A constitution of the printer module (PR):

The printer module (PR) 280 comprises a power switch 201, the system controller (SCON) 285, the external interface unit 286, the external-unit connector 286N, the interface memory 287, the bit-map expanding unit 288, a printer control unit 280c, a paper-supply cassette 222a, a paper-supply tray 222b, paper-supply rollers 223a and 223b, a pair of registration rollers 224, a photosensitive drum 218, charging scorotorons 219C, 219M, 219Y and 219K (FIG. 2), light-emission diode arrays 212C, 212M, 212Y, and 212K (FIG. 2), the recording interface unit 212a, a delay memory unit 212b, recording control units 212dC, 212dM, 212dY, and 212dK (FIG. 2), and converging light transferring arrays 214C, 214M, 214Y and 214K (FIG. 2).

The printer module (PR) 280 further comprises developing units 220C, 220M, 220Y and 220K for colors cyanide, magenta, yellow and black, a transferring corotoron 229, a cleaning unit 221, a used toner container 221t, a charge-removing corotoron 221c, a separating and carrying belt 230, a belt cleaner 230c, a fixing roller 236, a fixing back-up roller 237, an ejecting roller 238b, an ejecting-switching roller 238, a double-side tray 272, a double-side paper-supply roller 273, a group of pairs of carrying rollers 277a, 277b, and 277c, and a stacking roller 273a.

(10) A detailed constitution for an image forming process:

The photosensitive drum 218 and an inner construction thereof will now be detailed with reference to FIG. 2. An inner part 218g of the photosensitive drum 218 comprises a glass pipe which has good transparency for a wave length of light emitted by the light-emission-diode arrays 212C, 212M, 212Y, and 212K, for example, 720 nm. A transparent conductive layer and an organic photosensitive layer (OPC) are provided on an outer surface of the glass pipe. The transparent conductive layer is grounded so as to be the 0 potential of the duplicator.

An exposure module is fixed in the rotating drum. The exposure module comprises a thermal conductor 212s, a heater 218h, a heat pipe 218p, the recording interface unit 212a, the delay memory unit 212b, the recording control units 212dC, 212dM, 212dY, 212dK, the light-emission-diode arrays 212C, 212M, 212Y, and 212K, and the converging light transferring arrays 214C, 214M, 214Y and 214K. Each of the light-emission-diode arrays 212C, 212M, 212Y, and 212K comprises 14,256 pieces of light emission diodes arranged along one dimensional in a direction perpendicular to the sheet of paper on which FIG. 2 is printed. A light-emission density of each of the light-emission-diode arrays 212C, 212M, 212Y, and 212K is 48 dots/mm and a light emission shape of each array comprises an elongate elliptical shape having the longer dimension along the direction along which the light emission diodes are arranged and the shorter dimension along a direction perpendicular to the direction of the line of arrangement of the diodes. The light-emission-diode array comprises a plurality of semiconductor chips separated from each other, which semiconductor chips are mounted on a ceramic base substance.

Positions of the converging light transferring arrays 214C, M, Y, and K are adjusted so that an optical conjugate relationship between an emission point P1 of respective one of the light-emission-diode arrays 212C, M, Y, or K and a corresponding respective exposure point P2 of the photosensitive drum 218 is maintained for each of C, M, Y and K colors. The delay memory unit 212b is electrically located between the recording interface units 212a and the recording control units (212dC, 212dM, 212dY, and 212dK), and the unit 212b causes the respective M, Y, and K image signals among the four-color C, M, Y, and K image signals input to the recording interface unit 212a to be delayed, by respective predetermined times with respect to the corresponding C signal. The predetermined delay time comprises a time required for the drum 218 to rotate from the exposure position P2 of the C light to the exposure positions P2m, P2y, and P2k (not shown in FIG. 2), respectively, of M, Y, and K light.

(11) Image forming operations in the printer module (PR):

The printer module (PR) 280 forms and outputs a full-color visible image. The recording dot density of the full-color visible image comprising dot patterns is 48 dots/mm for each color of C, M, Y, and K colors, for the main scanning and for the sub-scanning. The above image forming operations are based on recording data input to the recording interface unit 212a. The recording data input has a 16 dots/mm of the pixel density and 256 tones for each color of the C, M, Y, and K colors, for the main scanning and for the sub-scanning. When the image forming cycle is started, the photosensitive drum 218 is rotated in the counterclockwise direction in FIG. 2 by means of a driving motor 211. While the drum 218 is rotating, the following actions are executed: a C latent image is formed, a C toner image is formed, a M latent image is formed, a M toner image is formed, a Y latent image is formed, a Y toner image is formed, a K latent image is formed, and a K toner image is formed, so that a toner image to be formed is formed by overlapping layers of C, M, Y, K.

The forming of the C image is executed as follows. The charging scorotoron 219C charges the photosensitive drum 218 to −700 V uniformly by means of a negative charge obtained by using corona discharging. The light-emission-diode array 212C then performs raster exposure based on the C signal. The recording signal for forming an image is provided by the basic image-processing means 241 in the general copy mode, and, in a special copy mode including the intelligent image-processing process, is provided by the image memory means 243.

The input recording signal is input to the recording interface unit 212a and the recording control unit 212dC then controls, for each input pixel unit, the light emission of the light-emission-diode array based on the input recording signal. In a more concrete example of the light emission control, the light emission diodes, (4 diodes for the main scanning) * (4 diodes for the sub-scanning) are made to emit in the full light emission ranges thereof when a pixel of the darkest-tone C is to be recorded; none of the light emission diodes emits light when a white pixel is to be recorded; and, when a half-tone pixel is to be recorded, a number of the light emission diodes emitting light is controlled to be in proportion to the degree of darkness of the half-tone pixel, or alternatively, a time during which the light emission diodes emit light is controlled to be in proportion to the degree of darkness of the half-tone pixel. The photosensitive drum 218 is exposed to light corresponding to the raster image in the manner mentioned above, then the charge of areas on the photosensitive drum 218 is discharged in proportion to the light exposure quantity, the drum 218 having been uniformly charged, and the above mentioned discharged areas being exposed to the light. Thus, the latent image is formed on the photosensitive drum 218.

Toner in the developing unit 220C is negatively charged by means of a doctor blade 212Cd. A developing roller 212Cm of the developing unit 220C is relatively biased with respect to a metal base substance layer of the photosensitive drum 218 by a potential, which comprises a potential resulting from addition of a negative direct-current potential and an alternating current voltage, which voltage is obtained by means of a power supply means (not shown in FIG. 2). As a result, toner does not adhere to portions of the photosensitive drum 218, in which portions charge remains. C toner is attracted to portions of the photosensitive drum on which charge does not remain, that is, it is attracted to portions that have been exposed to light, a C visible image similar to the latent image being thus formed on the photosensitive drum 218. Such a method for developing is generally called an inversion developing method.

M-image forming is executed as follows. The charging scorotoron 219M negatively charges the photosensitive drum 218 (on which the C toner image remains) to a −700 V uniformly by means of corona discharging. The light-emission-diode array raster-exposes the photosensitive drum 218 based on the M signal. The M recording signal, which is to be used to form the M image, was input to the recording interface unit 212a simultaneously with the C signal. However, the delay unit 212b then caused the M signal to reach the recording control unit 212dC after delaying the M signal by a time corresponding to a distance between the positions which have been C-exposed and a position to be M-exposed. Thus, controlling of light emission of the light-emission-diode array 212C in accordance with the delayed signal results in the M-image exposed position being precisely overlapping with the C toner image formed in accordance with single sampling-point data of the original image. The exposure of the photosensitive drum 218 to the light corresponding to the M raster image results in a charge of the portions on the photosensitive drum 218, which was uniformly charged, being thus discharged in proportion to the light exposure quantity, so that an electrostatic latent image is formed accordingly.

M toner in the developing unit 220M is negatively charged. A developing roller 212Mm of the developing unit 220M, which roller 212Mm is not in contact with the photosensitive drum 218, is biased using a potential similar to that in the case of the C developing process mentioned above. Thus, toner does not adhere to portions on which charge remains and M-toner is attracted so as to adhere to portions which have been M-exposed, so that an M visible image similar to the latent image is formed on the photosensitive drum 218. Similarly, a Y image is formed so as to overlap with the C and M toner image, and a K image is formed so as to overlap with the C, M and Y image. Because the basic image-processing unit 241 executes a UCR (Under Color removing) process, an undesirable event, that one pixel is developed using all four-color toner, occurs rarely.

The full-color image, formed on the photosensitive drum 218 as mentioned above is conveyed to the transferring mechanism by rotation of the drum 218, and then the image is transferred to the recording paper sheet while rotating the drum 218, the transferring of the image taking place at, and by means of the transferring mechanism. Before the above image forming process starts, a sheet of recording paper to which the image is to be transferred was supplied and conveyed from one of the three paper-supply units, that is, from one of the paper-supply cassette 222a, the paper-supply tray 222b, or the double-side tray 272, by using a paper supplying function of the paper-supply roller 223a, 223b, or of the double-side paper-supply roller 273, and the supplied sheet of recording paper is then brought to and maintained at a nipping portion of the pair of registration rollers 224. Then the pair of registration rollers 224 is driven so that the registration (alignment of the starting position of the sheet of recording paper, and the starting position of the image to be recorded) operation of the sheet of recording paper and the toner image located on the photosensitive drum 218 is executed. The registration operation is executed so that a position of an edge of the sheet of recording paper coincides with a position of an edge of the toner image located on the photosensitive drum 218 when the edge of the toner image, by the rotation of the drum 218, comes to the transferring and separating corotoron 229.

The sheet of recording paper is conveyed together with the rotation of the photosensitive drum 218, and the sheet of recording paper is made to overlap with the toner image located on the photosensitive drum 218 while the sheet of recording paper is conveyed. Further, the sheet of recording paper passes under the transferring and separating corotoron 229 which is connected to a positive potential power source during conveying of the sheet of recording paper. Then, the sheet of recording paper is positively charged by means of the corona-discharging current and the toner image on the photosensitive drum 218 is thus transferred to the sheet of recording paper. Then, when the sheet of recording paper passes through the separating and carrying belt 230, which is connected to another power source which causes another attracting force, stronger than an attracting force between the sheet of recording paper and the photosensitive drum 218, the other attraction force caused by the other power source thus functioning by means of the between the sheet of recording paper and the separating and carrying belt 230, so that the sheet of recording paper is separated from the photosensitive drum 218 and is then moved to the separating and carrying belt 230.

The sheet of recording paper on which the toner image is placed is transferred to the fixing roller 236 by means of the separating and carrying belt 230. Then, the nipping portion of the heated fixing roller 236 and the back-up roller 237 apply heat and pressure to the sheet of recording paper, so that the toner melts and penetrates fibers of the sheet of recording paper, the toner image thus being fixed on the sheet of recording paper. That is, the duplicated image is completed. Then, the finished duplicated image is ejected outside of the duplicator by means of the ejecting roller 238*b* and the switching roller 238. The ejected sheet of recording paper is then stacked on a tray, which is not shown in FIG. 1, in a condition where a reverse side (a side on which the above-mentioned duplicated image was not printed) of each of the sheets faces the bottom, in a sequence according to the sequence of the page numbers.

In a case where a both sides of each sheet of recording paper are to be imprinted with duplicated images, the switching roller 238 may be moved to a position 238*a* shown by a broken line so that the sheet of recording paper is guided into the both-side tray 272. In this case, sheet of recording paper with a first finished duplicated image passes between pair of the group of pairs of carrying rollers 277*a*, 277*b*, and 277*c* and is then stacked on the both-side tray 272 in a condition where the side of the sheet of paper with the duplicated finished duplicated image faces the top of the duplicator. There is an opening formed on the duplicator, which opening is located near the top of the both-side tray 272, and the stacked duplicated-image sheets of recording paper may be easily taken out by an operator through the opening. In this case, it is not necessary for the operator to assume an unnatural posture so as to take out the sheets. Thus, the both-side tray may be used for receiving ejected duplicated-image sheets of recording paper in the case where only one side of each of the sheets is used for printing. In this case, the operator has to set the corresponding operation mode by using the operation panel 251.

A small amount of toner remaining on the photosensitive drum 218 after the toner image is transferred to the sheet of recording paper is removed by means of the cleaning unit 221 so as to prepare for the next use of the photosensitive drum 218. The removed toner is then transferred to the used-toner container 221*t* through a collecting pipe 221*p*.

(12) Translation image-forming function:

The duplicator according to the embodiment of the present invention has a "translation image-forming function" as one function of the intelligent image-processing function. The translation image-forming function will now be described with reference to FIGS. 5 and 6.

An original-image sheet 102*a* comprises a sheet of paper on which an original image is located as shown in FIG. 5. The original image is to be duplicated by the duplicator according to the embodiment of the present invention. The original-image sheet 102*a* is placed on the platen 202 of the duplicator. The original image comprises sentences 102*aww* and the sentences 102*aww* comprise English-language words "The" 102*aw*1, "performances" 102*aw*2_1, "performance" 102*aw*2_2, "operational" 102*aw*3_1, and "operational" 102*aw*3_2.

A translated and duplicated-image sheet of recording paper 122*p* was produced using a sheet of recording paper supplied by one of the paper-supply cassette 222*a*, the paper-supply tray 222*b*, or the both-side tray 272 and performing the image-forming process so as to form the image on the supplied sheet of recording paper, thus producing a translated and duplicated-image sheet of recording paper. The translated and duplicated-image sheet of recording paper 122*p* comprises the translated and duplicated image 122*pww* which has been formed using toner. The translated and duplicated image 122*pww* comprises the duplicated original sentences 102*aww* and the translated Japanese-language words 122*pw*2_j and 122*pw*3_j which have been attached to the original sentences 102*aww*. The printed word "The" 122*pw*1 in FIG. 6 results from duplicating the word "The" 102*aw*1 in FIG. 5 and the printed word "performances" 122*pw*2_1 in FIG. 6 results from duplicating the word "performances" 102*aw*2_1 in FIG. 5. The additionally printed word "Seinou" (Japanese-language words are expressed herein, by the corresponding Roman letters) results from one of the occurrences of the word "performances" 102*aw*2_1 and 122*pw*2_1 being translated into the corresponding Japanese-language word. Similarly, the additionally printed word "Sousajou" 122*pw*3_j results from the word "operational" 103*aw*3_1 written in the original sentences 102*aww* being translated into the corresponding Japanese-language word.

Extra spaces in the translated and duplicated image 122*pww* are required in order to attach the Japanese-language words "Seinou" 122*pw*2_j and "Sousajou" 122*pw*3_j to the corresponding English-language words. Thus, spaces between lines 1 and line 2, and between lines 9 and 10 are caused to become wider during the translation and duplication image forming process. This widening results from parts of the original image being moved as necessary.

As shown in FIG. 6, only two words "performances" 102*aw*2_1 and "operational" 102*aw*3_1 in the original sentences 102*aww* are translated into the corresponding Japanese-language words; the other words such as, for example, "The" 102*a*1, are not translated and thus corresponding translation words are not printed in the translated and duplicated-image sheet 122*p*. This results from a function of the duplicator of the embodiment of the present invention. The function results in predetermined kinds of English-language words remaining untranslated, which predetermined kinds of English-language words comprise such as, for example, a kind of words that almost all Japanese can understand and/or another kind of words that are difficult to translate into appropriate simple Japanese-language words.

The other kind of words comprise, for example, a verb "is", and a preposition "with" of English language words. These words of the kinds have meaning that are easy to recognize, however it may be difficult to apply respective simple appropriate Japanese-language words to them. (This phenomena is obvious upon referring to an English-Japanese dictionary. For example, many translated Japanese-language words can be found corresponding to a verb "be" which should be referred to when the word "is" is used, in the original English-language document.). Further, translation of these words of the kinds is generally not necessary because actual meanings thereof is usually interpretable for a person who has a knowledge of the English language. Translation and printing out of the above kinds of words is redundant; this redundance results in difficult to read images, and unnecessarily consumes sheets of recording paper and processing time required for the translation and printing. Thus the above function of the duplicator according to the embodiment of the present invention eliminates the above problems.

Further, the duplicator according to the embodiment of the present invention has another function. The other function results in a word "Sousajou" $122pw3\_j$ being printed near the word "operational" $122pw3\_1$ and no translation word being printed near the word "operational" $122pw3\_2$ which is identical to the above word $122pw3\_1$. Similarly, the function results in the translation word "Seinou" $122pw2\_j$ being additionally printed near the word "performances" $122pw2\_1$ and no translation word being additionally printed near the word "performance" $122pw3\_2$ which is singular form of the above word "performances" $122pw2\_1$. This function results in advantages similar to the above mentioned advantages of the above function which does not translate, for example, the above kinds of words. That is, complicated and useless printing out can be prevented by omitting printing out of nearby words that are grammatically related, or similar to an already translation word. This is because a person who has read a translation word once does not forget the translation word for a period of time. In accordance with experiment, translation is necessary for similar, or grammatically related words only for the first occurrence of the relevant word to be translated in a page or only for the first occurrence of the relevant word to be translated in a paragraph. A word for which additional printing out of the translation word is not performed will be henceforward referred to as a "translation-unnecessary word".

Figure 7:
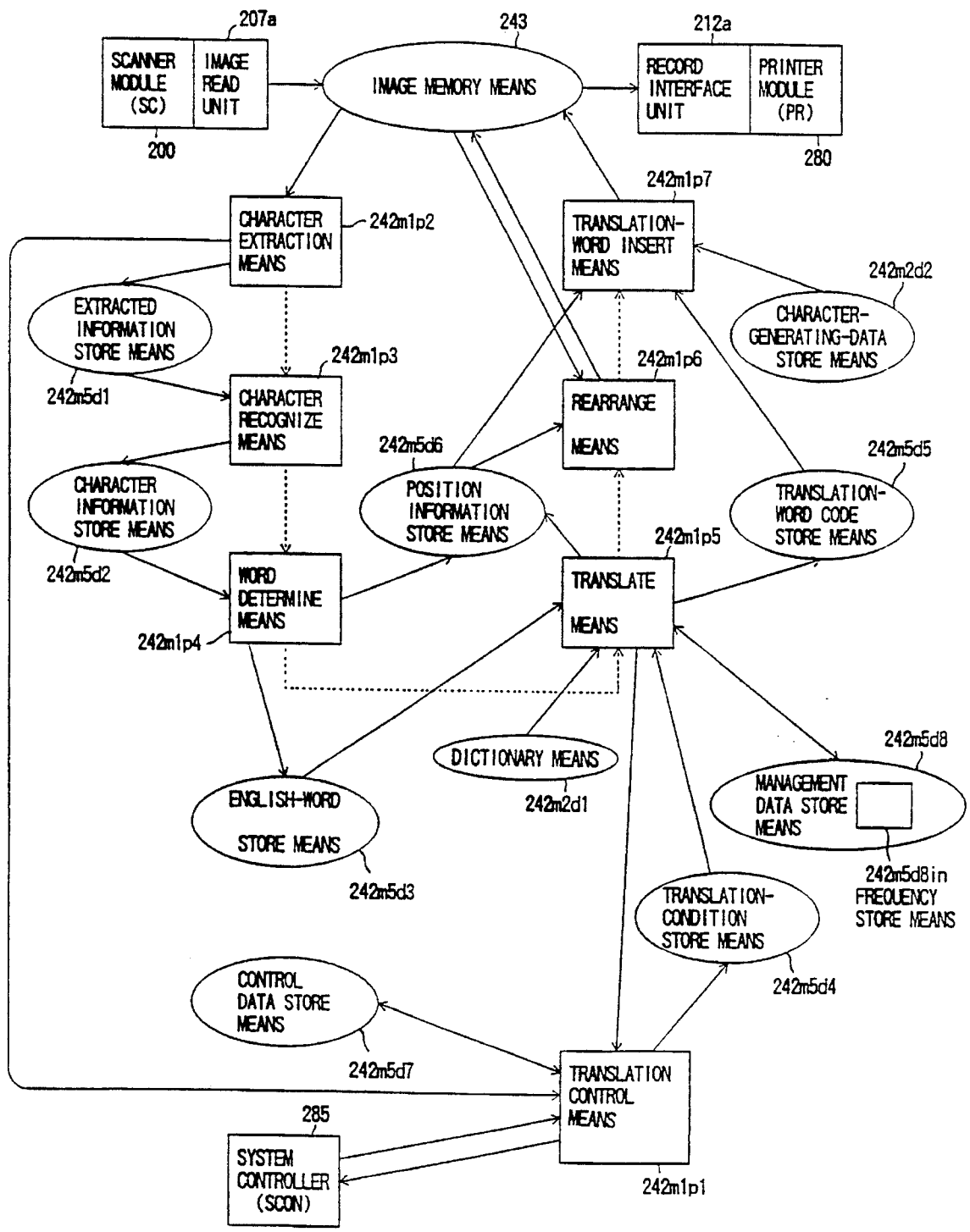
FIG. 7 shows flows of data for a process of translation in the duplicator of FIG. 1.
Figure 8:
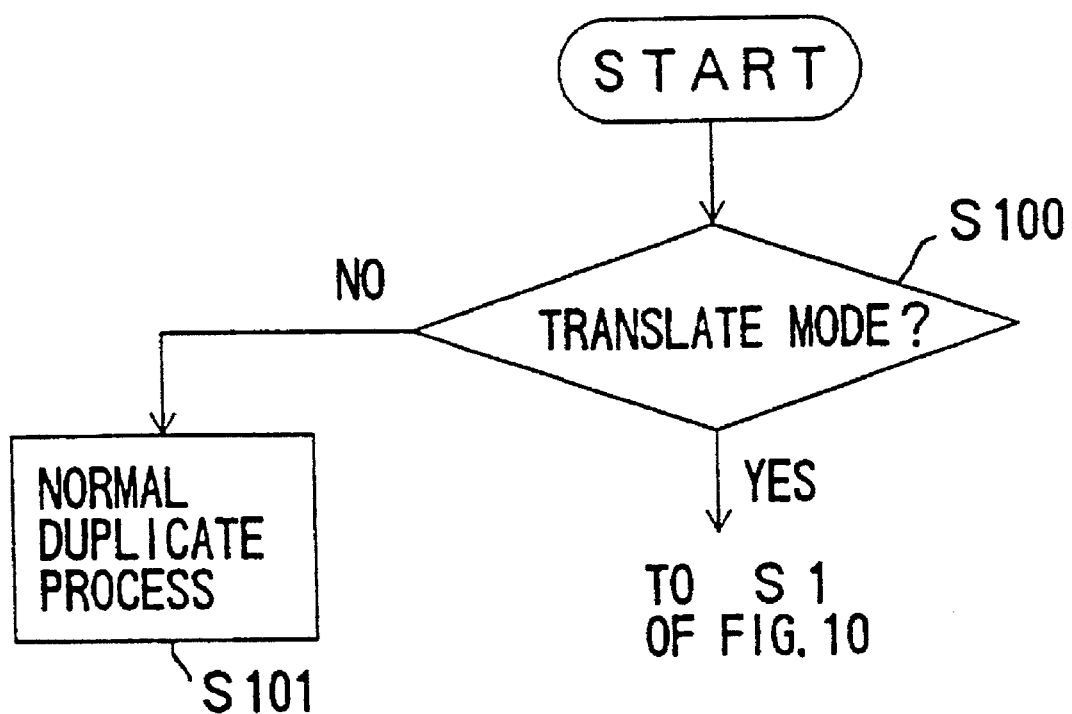
FIG. 8 shows a main operation flow of the duplicator of FIG. 1.

(13) A constitution of each means relating to the translation process:

Each means relating to the translation process, and related data flows will now be described with reference to FIG. 7 in which data flows are represented by arrows. Image data corresponding to the image $102a$ of FIG. 5, which image is read by means of the scanner module 200 (SC), is converted into corresponding white/black binary information by means of the process of the binarizing mode in the image reading means $207a$. Then, the converted binary information is stored in the image memory means 243. The image memory means 243 is also used to store image data output by the printer module (PR) 280.

The signal flow is not limited to that corresponding to the binary information corresponding to the image data of the original sheet $102a$ being read by the scanner module (SC) 200 and then directly transferred to and stored in the image memory means 243. The read data may instead be separated into a character (letter) area and a tone image area by means of the basic image-processing means 241 and only the data corresponding to the character area be transferred to and stored in the image memory means 243.

The intelligent image-processing means comprises a read only memory (ROM) $242m1$ which stores a plurality of module programs serving as the following means: translation control means $242m1p1$, character extraction means $242m1p2$, character recognition means $242m1p3$, word determination means $242m1p4$, translation means $242m1p5$, rearrangement means $242m1p6$, and translation-word insertion means $242m1p7$.

The intelligent image-processing means further comprises a second read only memory (ROM) that stores data, which data mainly comprises fixed data, serving as the following means: dictionary means $242m2d1$, and character-generating-data storing means $242m2d2$.

The intelligent image-processing means further comprises a random access memory (RAM) $242m5$ which stores variable data serving as the following means: extracted information storing means $242m5d1$, character-information storing means $242m5d2$, English-language word storing means $242m5d3$, translation condition storing means $242m5d4$, translation-word code storing means $242m5d5$, position information storing means $242m5d6$, control data storing means $242m5d7$, management data storing means $242m5d8$ which comprises frequency storing means $242m5d8in$.

(14) Operations of the translation control means:

The translation control means $242m1p1$ generally controls translation process. The system controller (SCON) 285 transmits to the translation control means $242m1p1$ various translation processing conditions, for example, a frequency of additionally printing out of similar translation words, printing out positions of translation word, printing out sizes of translation words, printing color of translation words, printing thickness of translation word, forced output of translation words, and other conditions, as commands. (The forced output means that, for example, all similar words have to be translated and the translation words are to be displayed on the output image even if the specification that limits a number of translation and output of the translation words for the similar words.)

Then, the translation control means $242m1p1$ reports to the system controller (SCON) 285 whether or not translation operation succeeds, or reports an error occurring if any, or other reports, as responses. Further, translation control means $242m1p1$ executes task management such as, for example, dispatching for other means and resource management such as, for example, allocating memories.

(15) Operations of the character extraction means $242m1p2$:

The character extraction means $242m1p2$ extracts all characters, including a space character, character by character from the corresponding white/black binary information having a pixel density of 16 dots/mm and having an image size of A3, which white/black binary information is stored in the image memory means 243. Then, the character extraction means $242m1p2$ writes into the extracted information storing means $242m5d1$ the coordinate data, a character size, and character image data corresponding to the extracted character.

(16) Operations of the extracted information storing means:

The extracted information storing means $242m5d1$ has a function that temporarily stores coordinate data, character size data, and character image data corresponding to an extracted character. Thus, the extracted information storing means 242m5d1 has to have a storing capacity sufficient for storing the data corresponding to at least one extracted character.

(17) Operations of the character recognizing means:

The character recognizing means 242m1p3 has a function that recognizes the extracted character image data having been stored in the extracted character information storing means 242m5d1 as a corresponding specific character. Further, the character recognizing means 242m1p3 normalizes (that is, varies a size to become a constant size so as to identify) the extracted character size. The character recognizing means then stores in the character information storing means 242m5d2 a JIS code, the character size data and character position information corresponding to the recognized character.

(18) Operations of the character information storing means:

The character information storing means 242m5d2 has a storing capacity sufficient for storing code information corresponding to almost 128 characters and serves as a buffers for code information corresponding to characters recognized by the character recognizing means 242m1p3 in a "first in, first out" (FIFO) method. Technology resulting from combination of conventional technology, for example, a template matching process or a topological matching process is used as the character recognizing algorithm.

(19) Operations of the word determination means:

The word determination means 242m1p4 determines corresponding words from character series data stored in the character information storing means 242m5d2 by examining the character series data including, for example, space characters, punctuation marks, and positions of capital letters. The duplicator according to the embodiment of the present invention is used for treating compositions or documents written using English-language words. The determined English-language word comprising the corresponding character series is then stored in the English-language word storing means 242m5d3. Further, the word determination means 242m1p4 stores in the position information storing means 242m5d6 a position of the word in the sheet of the image and a length and a breadth of the word as corresponding position information.

(20) Operations of the English-language word storing means:

The English-language word storing means 242m5d3 stores corresponding character series code data the English-language word determined by the word determination means 242m1p4, and the means 242m1p4 has a storing capacity sufficient for storing data corresponding to at least one word.

(21) Operations of the position information storing means:

The position information storing means 242m5d6 stores a position of the word in the sheet of the original image and letter sizes of the English-language word, and stores address data in a memory used to store a Japanese translation code to be described. The position information storing means 242m5d6 has to have a storing capacity sufficient for storing the data of position and length and breadth corresponding at least a plurality of words, which plurality of words correspond to words to be translated, and the means 242m5d6 does not need to have a capacity sufficient for storing all words in the original image.

(22) Operations of the dictionary means:

The dictionary means 242m2d1 stores dictionary data, a fist group of words and a second group of words. The first group of words may be called general words (symbol G) and the second group of words may be called basic words (symbol B).

(22)-1. The first group of words:

A corresponding Japanese-language word is stored in the first group of words, together English-language word (these English-language words may respectively be referred to as the head words) of the first group of words. Further, a fundamental form is stored for each word (referred to as a head word) of the first group of words, which head word comprises a word resulting from varying the above fundamental form. Examples of data stored in the dictionary means 242m2d1, which data comprises head words of the first group of words, for each head word either the respectively corresponding Japanese-language words or respectively corresponding fundamental forms and for each head word the respectively corresponding part of speeches, are described below, with reference to the following table 1:

TABLE 1

| head word | fundamental word | Japanese translation word | part of speech |
|---|---|---|---|
| operation | | Sousa, Unten | [noun] |
| operational | operation | | [adjective] |
| performance | | Seinou | [noun] |

A first line of the table 1, which line contains a word "operation" in a first column labeled [head word], has no associated word in a second column labeled [fundamental word]. Such a word "operation" is called a "fundamental form" word. A second line of the table 1, which line has a word "operational" in the column [head word], has a word "operation" in the column [fundamental word], and hence the word "operational" is not a fundamental-form word (non-fundamental-form word). A line such as the line of a non-fundamental-form word needs have no word in a third column [Japanese translation word] thereof. This results in a reduction of the required memory size. A line such as that for the non-fundamental-form word is not limited to the above form, in fact a form the same as that for the above fundamental form is permitted for a line for the non-fundamental-form word, that is, the column [Japanese translation word] for the word "operational" may have written therein a corresponding Japanese equivalent "Sousajou-no, Unten-no" and the corresponding column [fundamental word] may have no information written therein.

(22)-2. The second group of words:

Example of data stored in the dictionary means 242m2d1 which data corresponds to words of the second group of words is described as the following table 2. For the words of the second group of words, only a mark [B] is required, for determining that a position where the mark is stated is a position at which words are to be separated.

TABLE 2

| part of speech |
|---|
| a [B] |
| the [B] |
| of [B] |
| static [B] |

The dictionary means 242m2d1 does not store therein words predetermined as the above translation-unnecessary words and further predetermined as words that do not occur frequently in original compositions or documents, that is, words that occur only rarely. That is, neither the first nor the second groups of words comprises the above words. That is, among the "translation unnecessary" words, only certain translation unnecessary words, each of which word occurs in original compositions or documents relatively frequently, are stored as the second group of words in the dictionary. Words other than the translation unnecessary words are stored as the first group of words.

As is readily appreciated by those skilled in the art, "translation unnecessary words" are words of which the majority of Japanese people already know the translation, or are words whose meaning is easily understood but which are difficult to translate simply.

(23) Operations of the management data storing means:

The management data storing means $242m5d8$ comprises means for storing management data used for managing various translation processes, and includes the frequency storing means $242m5d8in$. The frequency storing means $242m5d8in$ comprises counting means for counting how many times a fundamental-form word and a non-fundamental-form word having a fundamental-form identical to the above fundamental-form word are referred. The counting is executed for each word in the first group of words, for which word to be counted has a common fundamental-form, or for which word to be counted comprises a common fundamental-form word itself. Thus, the frequency storing means has to have a plurality of counting means and the number of counting means in the plurality of counting means has to be identical to the number of fundamental-form words included in the first group of words.

For example, a respective counting means is allocated to each of the words "operation" and "performance". No counting means is allocated to the word "operational" because the word "operational" has the corresponding fundamental-form word "operation" and the counting means allocated to the word "operation" also counts the occurrences of the word "operational" as well as counting the occurrences of the word "operation".

Further, before the translation process for a page of the original image is started, counting values for all fundamental-form words of the frequency storing means $242m5d8in$ are initialized to "0". In a case where the translation control means $242m1p1$ writes an "initializing flag" in the translation condition storing means $242m5d4$ for each time a paragraph of the image is started, the counting values are initialized accordingly. Such a flag operation is executed by the translation control means $242m1p1$. The translation control means $242m1p1$ determines contents of the flag operation in accordance with "a translation word print out condition" among the translation conditions transmitted by the system controller (SCON) 285.

Concrete example of the above operation will be described following.

(a) In a case where the "translation word print out condition" is specified so as to print out a translation word for one of similar words (similar words denotes the words having the common fundamental-form word or comprising the common fundamental-form word itself) in a new page, the initializing flag is written once so as to initialize the counting values to "0" when the translation process for the page is started. Thus, the translation word for similar words is printed out only in a case where the corresponding similar word first occurs in each page.

(b) In the case where the "translation word print out condition" is specified so as to printing out a translation word for a similar word in each new paragraph, the initializing flag is written each time a paragraph is started so as to initialize the corresponding counting values to "0". The starting of each paragraph is detected by the translation control means $242m1p1$ by examining the word codes determined by the word determination means $242m1p4$, and stored in the English-language word storing means $242m5d3$ and by examining the position information stored in the position information storing means $242m5d6$. In this case, a translation word for the similar words is printed out only in a case where the corresponding similar word first occurs in each paragraph.

(c) In a case where "the translation word print out condition" is specified so as to once print out a translation word for similar words for each N occurrence of the similar words, the translation control means $242m1p1$ transfers the value N to the translation means $242m1p5$. The translation means $242m1p5$ then initializes the counting values when the translation process for each page of the image is started and the translation means $242m1p5$ initializes each of the counting values when a corresponding one of the counting values reaches the value N. In this case, the translation word for the similar words is printed out only once for each N occurrence of the similar words.

Alternatively, the "translation word printing out condition" may be specified by using the console 250 so as to print out a translation word for similar words once for each N lines of the composition or document of the original image.

(24) Operations of the translation word storing means:

The translation word code storing means $242m5d5$ stores therein character codes corresponding to each of the Japanese-language words.

(25) Operations of the translation means:

The translation means $242m1p5$ performs the following process on an English-language word (the present word, i.e. the word currently being considered) determined by the word determination means $242m1p4$ and then stored in the English-language word storing means $242m5d3$.

(a) If the present word is included in neither the first nor the second group of words in the dictionary means $242m2d1$, the present word is determined as a translation-unnecessary word and corresponding "translation-unnecessary determined information" is then transmitted to the translation means $242m1p1$.

(b) If the present word is included among the second group of words of the dictionary means $242m2d1$, the present word is determined as a translation-unnecessary word and a corresponding "translation-unnecessary determined information" is reported to the translation means $242m1p1$.

(c) If the present word comprises a word among the first group of words of the dictionary means $242m2d1$ and also the counting value corresponding to the present word or corresponding to the fundamental-form word of the present word is not "0" in the frequency storing means $242m5d8in$ of the management data storing means $242m5d8$, the present word is then determined as a translation-unnecessary word and a corresponding "translation-unnecessary determined information" is then reported to the translation means $242m1p1$. Further, the counting value of the present word or the counting value of the fundamental-form word of the present word is incremented by "1" in the frequency storing means $242m5d8in$.

(d) If the present word comprises a word among the first group of words of the dictionary means $242m2d1$ and also the counting value corresponding to the present word or corresponding to the fundamental-form word of the present word is "0" in the frequency storing means $242m5d8in$ of the management data storing means $242m5d8$, the present word is then determined as a translation-necessary word. Thus, code information corresponding to a Japanese-language word corresponding to the present word read from the dictionary means $242m2d1$ is thus stored in a predetermined address of the translation-word code storing means $242m5d5$. Then the address in which the Japanese-language-word code (translation word code) corresponding to the present word is stored in the translation-word code storing means $242m5d5$ is stored in the position-information storing means $242m5d6$, and the counting value of the present word or the counting value of the fundamental-form word of the present word is incremented by "1" in the frequency storing means $242m5d8in$.

Further, if a plurality of the different corresponding Japanese-language words (for example, Sousa and "Unten" for "operation") are obtained, a number of obtained Japanese-language words is limited by a corresponding predetermined number stored in the translation condition storing means $242m5d7$.

(26) Operations of the rearrangement means:

The rearrangement means $242m1p6$ moves a part of or all the image data stored in the image memory means $243$ as appropriately to rearrange the image data so as to provide a necessary space between lines, in which space the Japanese-language word is to be inserted. The address in the translation word code storing means $242m5d5$ of the code corresponding to the above Japanese-language word (translation word) is stored in the position-information storing means $242m5d6$ as mentioned above. A size of the space between lines, which space the rearrangement means $242m1p6$ is to make, is caused to be identical to a "translation word height", which has been predetermined and stored in the translation condition storing means $242m5d7$.

(27) Operations of the character generating data storing means:

The character-generating data storing means $242m2d2$ stores bit-map image data of (48 dots) * (48 dots) (that is, bits are arranged as a matrix having 48 rows and 48 columns) for characters used to make Japanese-language words such as, for example, the Chinese characters, Japanese characters "kana, alphabets, and numerals, correspondingly to respective character codes.

(28) Operations of the translation word insertion means:

The translation word insertion means $242m1p7$ read the Japanese-language-word (translation word) code corresponding to the present (English) words from the translation-word code storing means $242m5d5$ according to the address in the translation-word code storing means $242m5d5$, in which address the corresponding Japanese-language word (translation word) code was stored, and which address was stored in the position information storing means $242m5d6$. When the Japanese-language word (translation word) corresponding to the read translated-Japanese-word code is to be inserted, bit-map image data corresponding to the Japanese-language word (translation word) code is read from the character-generating data storing means $242m2d2$. The read bit-map image data is then written in the image memory means $243$ additionally to the image data already stored therein. A size of the inserted character corresponding to the bit-map image data is caused to be identical to "the translated character height" which was previously stored in the translation condition storing means $242m5d7$. If the size specified in "the translated character height" is different from the size corresponding to the (48 bits) * (48 bits) bit-map image data, that is, the size of 3 mm, this size of 3 mm is then changed so as to coincide with the "translated character height".

Similarly, a color and a tone of the translated character are determined according to data corresponding to a predetermined translated character color and a predetermined translated character tone stored in the translation condition storing means $242m5d7$, and corresponding data is then stored. The image memory means $243$, which read the original image in the monochromatic binarizing mode in the image reading process, has a function that can store a multi-value data of 8 bits for each color. Thus, the duplicator according to the embodiment of the present invention may print out translation words in a half-tone color other than black.

(29) Operations of the translation condition storing means:

The translation condition storing means $242m5d4$ stores a translation word print out frequency, the size of the translation word, the color and tone in printing of the translation word, a number of different translation words (for example, Sousa and "Unten" for "operation") to be printed for each English-language word and other conditions.

(30) Operations of the control data storing means:

The control data storing means $242m5d7$ stores various variables to be used to control the translation process.

(31) Flows of processes:

Flows of processes performed in the duplicator according to the embodiment of the present invention will now be described with reference to FIGS. 5, 6, 8, 9A, 9B and 10. An operator specifies a translation-and-duplication mode by using the display 251 (shown in FIGS. 9A and 9B) of the console 250 (Yes in a step S100 in FIG. 8, the word "step" will be omitted hereinafter, so that, for example, a step S100 is written as "S100"). If the operator specifies the normal-duplication-only mode (No in S100), the normal-duplication-only operation is performed.

The specification of the translation-and-duplication mode is executed as follows. When power is applied to the duplicator, the display 251 of the console 250 indicates the image of FIG. 9A. If the normal-duplication-only mode is to be executed, the operator is to specify necessary basic conditions for the duplication operation (a number of duplicated-image sheets, a tone of duplicated image, and other well-known conditions if any) by using a touch-switch image 251*b* for specifying details of operations in the given mode; the normal-duplication-only operation is then executed (S101). If the translation-and-duplication mode is to be executed, the operator is to touch another touch-switch image 251*a* after the above-mentioned basic operations of the duplication operation are specified by use of the touch-switch image 251*b*. Thus, the translation-and-duplication mode is specified and the operator is then to touch a touch-switch image 251*c* in order to start. Consequently, the image of the display 251 changes to the image of FIG. 9B.

When the display 251 indicates the image of FIG. 9B, the operator is to specify translation-and-duplication conditions for the translation-and-duplication mode by using a corresponding touch-switch image 251*d*. The above translation-and-duplication conditions comprise, as mentioned above in item (29), conditions to be stored in the translation condition storing means $242m5d7$ such as the translation word print out frequency, the size in printing of the translation word, the color and tone in printing of the translation word, a number of different translation words (for example, Sousa and "Unten" for "operation") to be attached for each English-language word, and other conditions.

(Further, it is also possible to additionally provide in the duplicator function such as to specify other conditions in addition to the translation-and-duplication conditions which other conditions are such as disclosed in Japanese Laid-Open Patent Application No. 64-57369. That is, each word stored in the dictionary means 242m2d1 has a corresponding ranking information for ranking the words in accordance with a corresponding part of speech, or in accordance with a rank representing a difficulty level associated with interpreting the word. Such ranks are selected arbitrarily. Further, the output image may have a construction such as shown in FIG. 6 of Japanese Laid-Open Patent Application No. 64-57369, that is, the duplicated image may be located on the left side in the output image, while duplicated original words and corresponding translation words are printed out next to each other to the right of the duplicated image in the output image.)

Then, after the necessary specifications are completed, the operator is to touch the touch-switch image 214c of FIG. 9B so as to start the translation-and-duplication process. The translation control means 242m1p1 thus receives translation-and-duplication conditions from the system controller (SCON) 285 and then stores them in the translation condition storing means 242m5d4, the translation-and-duplication conditions having been specified by the operator using the display 251 as mentioned above (S1).

Some examples of translation-and-duplication conditions stored in the translation condition storing means 252m5d4 are as follows:

(a) a translation word print out frequency: once for each page;

(b) translation word printing position: just below the corresponding English-language word;

(c) translation word size: 3 mm;

(d) translation word color: black;

(e) translation word tone: light tone; and (f) request of forced printing out (corresponding to the above forced output): not needed. Then, the scanner module (SC) 200 scans so as to read the original image 102aww of FIG. 5 and stores the read image data in the image memory 243 (S2).

The character extraction means 242m1p2 then extracts from the read image 102aww, characters, "T", "h", "e", and " " (a space character) (S3), in accordance with the written sequence. The extraction of space characters is limited to extraction of one or two space characters. The character recognizing means 242m1p3 recognizes the extracted characters, one by one, and determines JIS codes corresponding to the recognized characters (S4). Then, the word determining means 242m1p4 determines (defines) a series of the recognized characters 102aw1 as a corresponding word "The" and stores the word in the English-language word storing means 242m5d3 in the format of character series codes (S5).

Then, the translation means 242m1p5 searches the head words of the basic words (the second group of words) of the dictionary means 242m2d1 for the determined word "The" (this operation is called "basic word retrieval function") (S6). In the example of the word "The", this word "the" was stored as a word of the second group of words (Yes in S7). Thus, the word "The" is determined as a translation-unnecessary word and the operation flow proceeds into S15. It is then determined in S15 whether or not the process for the page of the image is completed. In this case, the process is not completed and thus the operation flow is returned to S3.

Then, the character extraction means 242m1p2 again extracts characters "p", "e", "r", "f", "o", "r", "m", "a", "n", "c", "e", "s", and " " (space), in accordance with the written sequence (S3). Then, the character recognizing means 242m1p3 recognizes these characters one by one and determines the corresponding JIS codes (S4). Then, the word determination means 242m1p4 determines the character series 102aw2_1 as a word "performances" and stores the word in the English-language word storing means 242m5d3 in the format of character series codes (S5).

Then, the translation means 242m1p5 retrieves the second group of words of the dictionary means 242m2d1 for the word "performances" (the basic word retrieval function) (S6). In this case, the word "performances" was not stored among the second group of words (No in S7). Thus, the translation means 242m1p5 then searches the first group of word for the word "performances" (this operation is called "general word retrieval function) (S8). If the word is not found as a result of S8, the word is determined as a translation-unnecessary word and then the operation flow should proceed to S15 which determines whether or not the process for the entire page has been completed.

In this case, a word completely identical to the determined word "performances" was not stored in the first group of words of the dictionary means 242m2d1. However, a singular-form word "performance" corresponding to the word "performances" was stored in the first group of words of the dictionary means 242m2d1. Thus, the translation means 242m1p5 determines that the word "performances" is a plural-form word of the word "performance" of the first group. If a corresponding word is found as a word of the first group as in the above case, the translation means 242m1p5 examines in S10 the counting value, corresponding to the present word, of the frequency storing means 242m5d8in in the management data storing means 242m5d8, and thus determines in S11 whether or not the present word is a word for which a corresponding translation word is to be printed out (This operation is called an "output condition examining function").

If a result of the determination of S11 was negative, that is, if the translation word is not to be output (No in S11), the word is to be determined as a translation-unnecessary word and the operation flow then should proceeds to the S15. In this case, the corresponding counting value is still "0", and then the result of the determination in S11 is that the translation word is to be output (Yes in S11). Further, the preset number of translation words to be printed out is "1", this present number being stored in the translation condition storing means 242m5d4. Thus, the translation means 242m1p5 then writes in the translation-word code storing means 242m5d5 a character series "Seinou" corresponding to the translation word of the present word "performances" and then writes the corresponding memory address in the translation-word code storing means 242m5d5, in which memory address the character series "Seinou" has been written. The translation word "Seinou" is a first word among a plurality of the translation words corresponding to the present word "performances" in the dictionary means 242m2d1 as shown in Table 1. These operations of S12 are called "translation word addition function" of S12.

Then, the rearrangement means 242m1p6 moves a portion of the image expressing the English-language composition (corresponding to the image 102aww of FIG. 5) stored in the image memory 243 so as to make a space between lines in which space the translation word "Seinou" is to be inserted (this operation is called "a rearrangement process") (S13). In this case, the specified size (height) of the translation word is 3 mm and thus the moved part of the image 102*aww* is moved downward by 3 mm, the above moved part comprising the image 102*aww* except for the first line thereof.

Then, the translation word insertion means 242*m*1*p*7 performs a translation word insertion process (S14), that is, the translation word insertion means 242*m*1*p*7 inserts the image data corresponding to the translated Japanese-language word "Seinou" 122*pw*2_j in the space between lines which space has been made in S13 previously, the translation word insertion process being performed in accordance with the preset size, color and tone in printing of the translation word. The remaining words such as, for example, "of", "static", "random", etc., of the composition of the image 102*aww* are similarly processed successively.

In the above processing of the word "performance" 102*aw*2_2 of the image 102*aww* of FIG. 5, the word is processed as follows. The word "performance" 102*aw*2_2 is identical to a word among the first group stored in the dictionary means 242*m*2*d*1, thus, the word is determined as a translation-necessary word (Yes in S9). However, the corresponding counting value in the frequency storing means 242*m*5*d*8*in* is "1" because of the occurrence of the word "performances" 102*aw*2_1 resulting in the counting value being incremented as mentioned above. Thus, the word 102*aw*2_2 is determined this time as a translation-unnecessary word (No in S11) and thus the operation flow proceeds to S15.

When the word "operational" 102*aw*3_1 is determined by the word determining means, the word is processed as follows. The word corresponds to a word among the first group in the dictionary means 242*m*2*d*1 and thus is determined as a translation-necessary word (Yes in S9). Further, the corresponding counting value of the frequency storing means 242*m*5*d*8*in* is "0" because this is the first time occurrence of the word. Thus, the word is determined as a word to be output (Yes in S11). In the dictionary means 242*m*2*d*1, as shown in Table 1, there is no word written in the corresponding column [Japanese translation word], there is a word "operation" written in the corresponding column [fundamental form], and there is a word "adjective" written in the corresponding column [part of speech]. In this case, the translation means 242*m*1*p*5 derives the appropriate Japanese translation word "Sousajou-no" corresponding to the word "operational" from the translation word "Sousa" corresponding to the fundamental-form word "operation", the word "Sousajou-no" comprising the adjective form of the word "Sousa", the derivation being made by means of a predetermined algorithm.

In S12, the translation means 242*m*1*p*5 writes in the translation-word code storing means 242*m*5*d*5 the character series codes corresponding to the translation word "Sousajou-no", which word is adjective form of the word "Sousa", which word "Sousa" is first among a plurality of different translation words ("Sousa" and "Unten") in the dictionary means 242*m*2*d*1 corresponding to the present word "operation", as shown in Table 1. This is because the preset number of different translation words to be printed is "1" which present number was previously stored in the translation condition storing means 242*m*5*d*4. Then, the memory address in the translation-word code storing means 242*m*5*d*5, at which address the translation word code corresponding to the translation word "Sousajou-no" was written, is written in the position information storing means 242*m*5*d*6.

In a case where the number of translation words to be printed was preset as a number greater than "1" in the translation condition storing means 242*m*5*d*4, the translation means 242*m*1*p*5 determines to print out a plurality of different translation words for the word "operational", a number of words corresponding to the plurality of different translation words being equal to or less than the above preset number. (The number of words corresponding to the plurality of different translation words becomes equal to the preset number if the different translation words which can be obtained from the dictionary means 242*m*2*d*1 for the present original word is not less than the present number, and the number of words becomes less than the preset number if the different translation words which can be obtained from the dictionary means 242*m*2*d*1 for the present original word is less than the present number.)

As a result, the corresponding translation words to be printed should comprise the two words "Sousajou-no, Unten-no" as the corresponding [Japanese translation words] column of Table 1. A relationship between the capacities of the translation means 242*m*1*p*5 and the dictionary means 242*m*2*d*1 is as follows: the smaller the capacity of the translation means 242*m*1*p*5, the larger the capacity of the dictionary means 242*m*2*d*1 has to be, and vice versa. The above description implies at least two alternatives: the dictionary means 242*m*2*d*1 can be simplified, and the functions of the translation means 242*m*1*p*5 are enriched while reducing the total memory size of the apparatus, or the processing speed can be improved and the translation means 242*m*1*p*5 can be simplified while the total memory size of the apparatus is increased and the dictionary means 242*m*2*d*1 are enriched and the contents thereof are increased.

Then, when the process for the page of the image has been completed (Yes in S15), an image outputting process is executed (S16). It is then determined in S17 whether or not the processes for all pages of the original images has been completed. Then, if it is determined in S17 that all pages having been completed, a finishing process is executed in S18. In S18, the translation control means 242*m*1*p*1 transmits an image forming request to the system controller (SCON) 285. The system controller (SCON) 285, then, in response to the receipt of the image forming request, causes the printer module (PR) 280 to act so as to output the image, and the printer module (PR) 280 then completes of forming of the translated and duplicated image such as shown in FIG. 6 in accordance with image data resulting from combination of the original image with the inserted translation-word images formed in the image memory 243. Then the process ends.

An advantage resulting from the present invention is to enable production of an easy-to-read translated-and-duplicated output image by limiting the words to be translated so that translation words are printed in a condition where a number of translation words to be printed is appropriate, appropriate translation words are printed out and translation words are printed out in appropriate positions.

Another advantage resulting from the present invention is an improvement of a process for determining translation-unnecessary words so as to provide a simple and thus speedy process by storing the second group of words in the dictionary means.

Another advantage resulting from the present invention is reduction in complicatedness of the output translated-and-duplicated image, thus improving the processing speed by eliminating unnecessary repeated printing out of similar words.

Another advantage resulting from the present invention is enabling a reduction of the required memory capacity by eliminating a storing of the translation words corresponding to the second group of words to be determined as translation-unnecessary words and only head words are stored in the dictionary means for the second group of words.

Another advantage resulting from the present invention is a simplification of the output translated-and-duplicated image and thus improvement of the processing speed by eliminating translation words such as foreign language words which have meanings comparatively easy to recognize but for which simple appropriate corresponding translation words are difficult to find.

Further, the present invention is not limited to the above described embodiment, and variations and modifications may be made without departing from the scope of the present invention.

What is claimed is:

1. An image forming apparatus, comprising:
   a) image reading means for reading in image information representing an original image;
   b) extracting means for extracting original words from said image information;
   c) dictionary means for storing one or a plurality of translation words for each word of one or a plurality of predetermined words;
   d) setting means for setting a set number;
   e) translation means including:
      1) means for selecting, for each word of said original words, one or a plurality of translation words from among the one or a plurality of translation words stored in said dictionary means for a corresponding word, a number of the thus-selected one or a plurality of translation words being not larger than said set number; and
      2) means for outputting said thus-selected one or a plurality of translation words; and
   f) image forming means for forming a translation word image of the thus-output one or a plurality of translation words, said translation word image being then inserted into said original image below an original word image representing a corresponding word.

2. An image forming apparatus, comprising:
   a) image reading means for reading in image information representing an original image;
   b) extracting means for extracting original words from said image information;
   c) dictionary means for storing one or a plurality of translation words for each word of one or a plurality of predetermined words;
   d) setting means for setting a unit area;
   e) translation control means including:
      1) means for retrieving, for each word of said original words, the one or a plurality of translation words stored in said dictionary means for a corresponding word; and
      2) means for outputting the thus-retrieved translation words, the translation words being output for a same original word only once for every unit area of said original image even if said same original word appears a plurality of times in a corresponding unit area; and
   f) image forming means for forming a translation word image of the thus-output translation words, said translation word image being then inserted into said original image below an original word image representing a corresponding word.

3. An image forming apparatus, comprising:
   a) image reading means for reading in image information representing an original image;
   b) extracting means for extracting original words from said image information;
   c) dictionary means for storing one or a plurality of translation words for each word of one or a plurality of predetermined words;
   d) setting means for setting a unit number N;
   e) translation control means including:
      1) means for retrieving, for each word of said original words, the one or a plurality of translation words stored in said dictionary means for a corresponding word; and
      2) means for outputting the thus-retrieved translation words, the translation words being output for a same original word only once for every N appearances of said same original word in said original image; and
   f) image forming means for forming a translation word image of the thus-output translation words, said translation word image being then inserted into said original image below an original word image representing a corresponding word.

* * * * *